US007918436B2

(12) United States Patent
Hara

(10) Patent No.: US 7,918,436 B2
(45) Date of Patent: Apr. 5, 2011

(54) VALVE ELEMENT OPENING/CLOSING DEVICE

(75) Inventor: Tetsuhiko Hara, Nagano (JP)

(73) Assignee: Nidec Sankyo Corporation (JP)

( * ) Notice: Subject to any disclaimer, the term of this patent is extended or adjusted under 35 U.S.C. 154(b) by 431 days.

(21) Appl. No.: 12/102,081

(22) Filed: Apr. 14, 2008

(65) Prior Publication Data

US 2008/0258089 A1      Oct. 23, 2008

(30) Foreign Application Priority Data

Apr. 12, 2007   (JP) ................................ 2007-104620

(51) Int. Cl.
*F16K 31/02*          (2006.01)
(52) U.S. Cl. ................. 251/129.12; 251/251; 251/263; 137/606
(58) Field of Classification Search ............. 251/129.11, 251/129.12, 129.13, 251, 252, 253, 262, 251/263; 137/605, 606, 607
See application file for complete search history.

(56) References Cited

U.S. PATENT DOCUMENTS

| | | | | |
|---|---|---|---|---|
| 4,357,957 A | * | 11/1982 | Bisonaya et al. | 137/636.1 |
| 4,436,280 A | * | 3/1984 | Geisow | 251/229 |
| 5,067,359 A | * | 11/1991 | Flaig et al. | 74/107 |
| 6,007,047 A | * | 12/1999 | Phipps | 251/252 |
| 6,534,793 B1 | * | 3/2003 | Heritier-Best | 257/77 |
| 6,769,665 B2 | * | 8/2004 | Silva et al. | 251/71 |
| 6,918,408 B2 | * | 7/2005 | Hara | 137/597 |
| 7,284,571 B2 | * | 10/2007 | Ozawa et al. | 137/625.46 |
| 7,475,704 B2 | * | 1/2009 | Hara et al. | 137/625.11 |

FOREIGN PATENT DOCUMENTS

JP           2000-346225 A      12/2000

* cited by examiner

*Primary Examiner* — John K Fristoe, Jr.

(74) *Attorney, Agent, or Firm* — Cantor Colburn LLP

(57) ABSTRACT

A valve element opening/closing device may include a main body, an inflow pipe, an outflow pipe, a valve element, and a drive part for driving the valve element to open and close a flow passage. The drive part may include a linearly moving mechanism part for driving the valve element, which may include a rotary power transmission member, a linearly moving member for moving the valve element, a turning prevention mechanism, and an urging member for urging the valve element in a closing direction. The turning prevention mechanism may include a shaft turnably supporting the rotary power transmission member, and a shaft hole formed in the linearly moving member that is supported by the shaft, and the shaft is engaged with the shaft hole to prevent turning of the linearly moving member.

10 Claims, 10 Drawing Sheets

[Fig. 1]
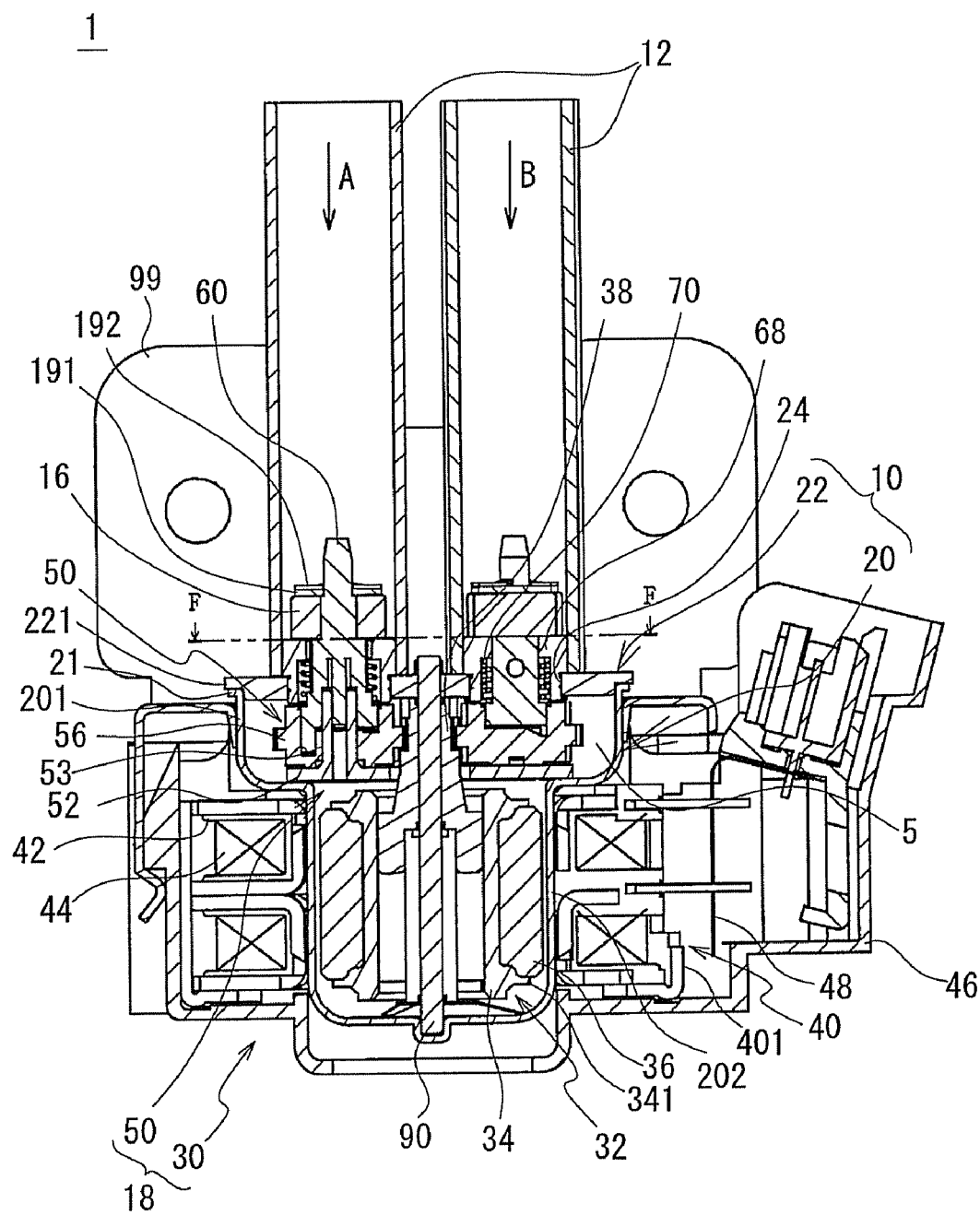

[Fig. 2]
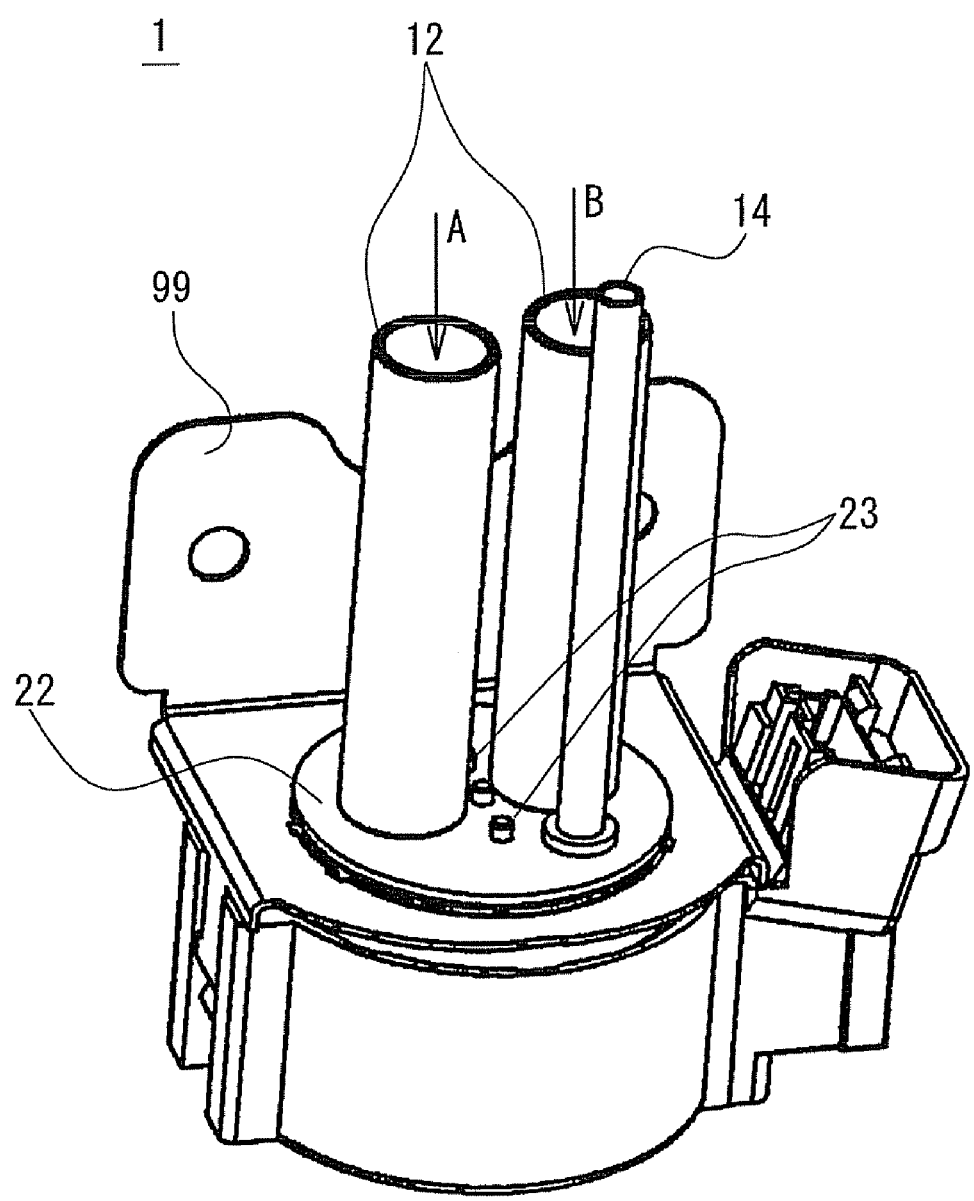

[Fig. 3]
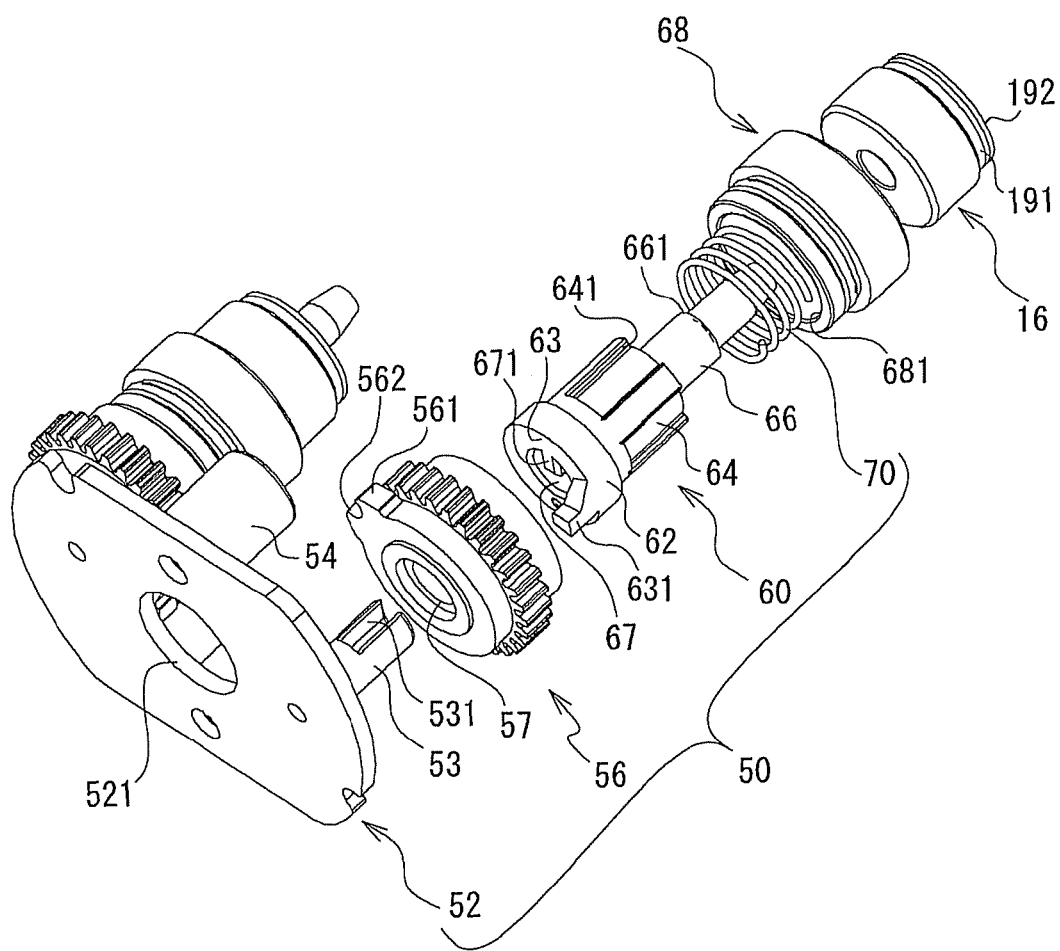

[Fig. 4]
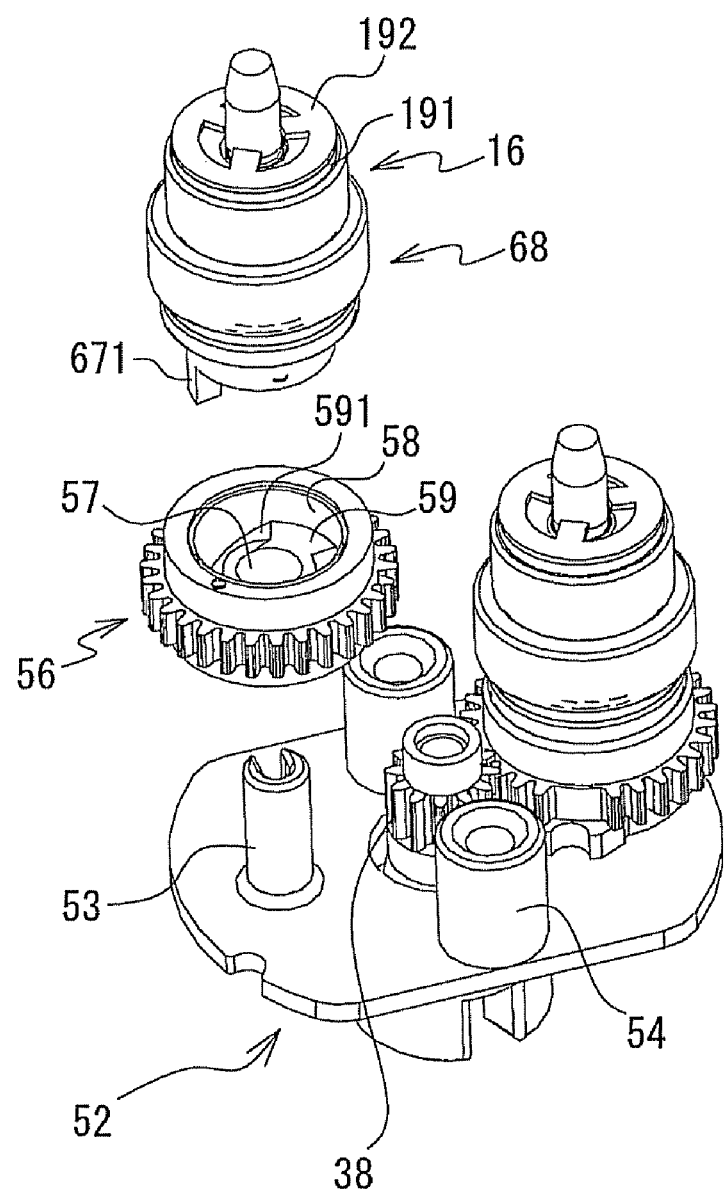

[Fig. 5]
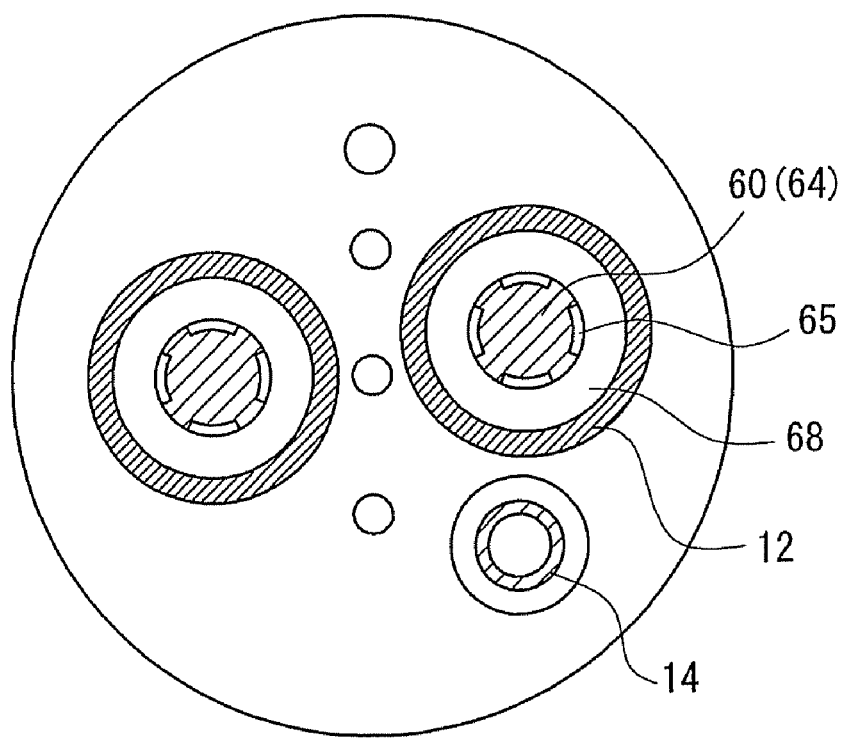

[Fig. 6]
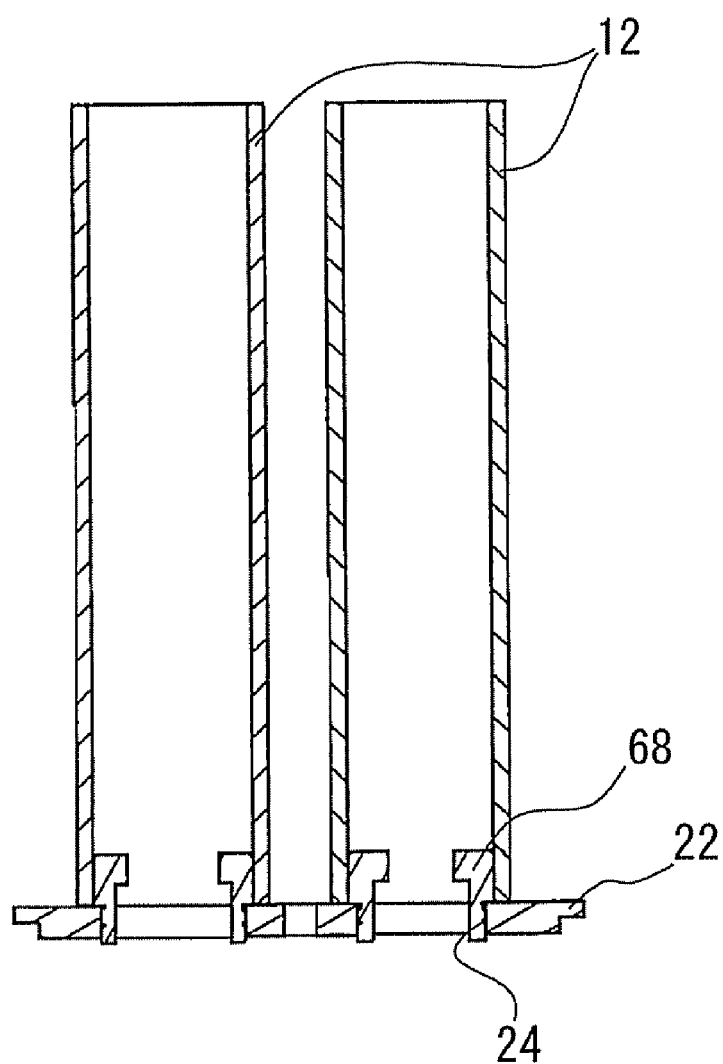

[Fig. 7]
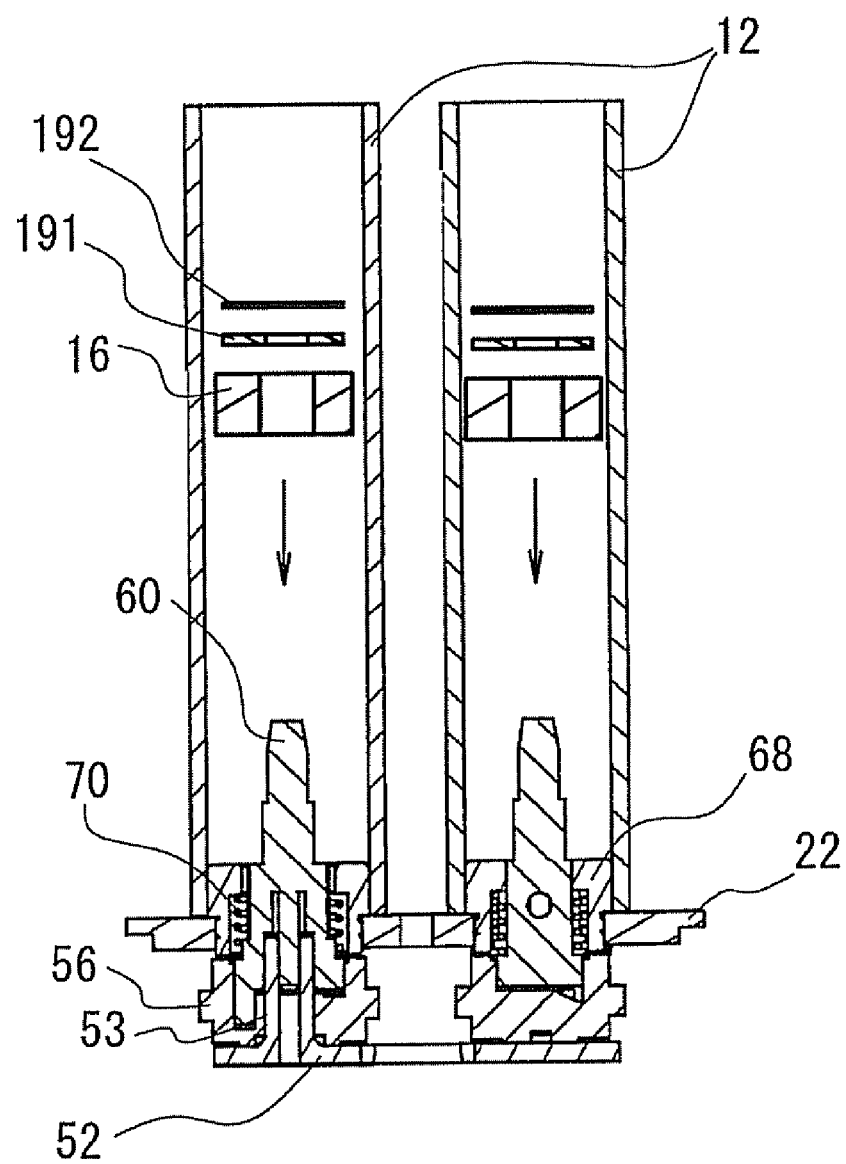

[Fig. 8]
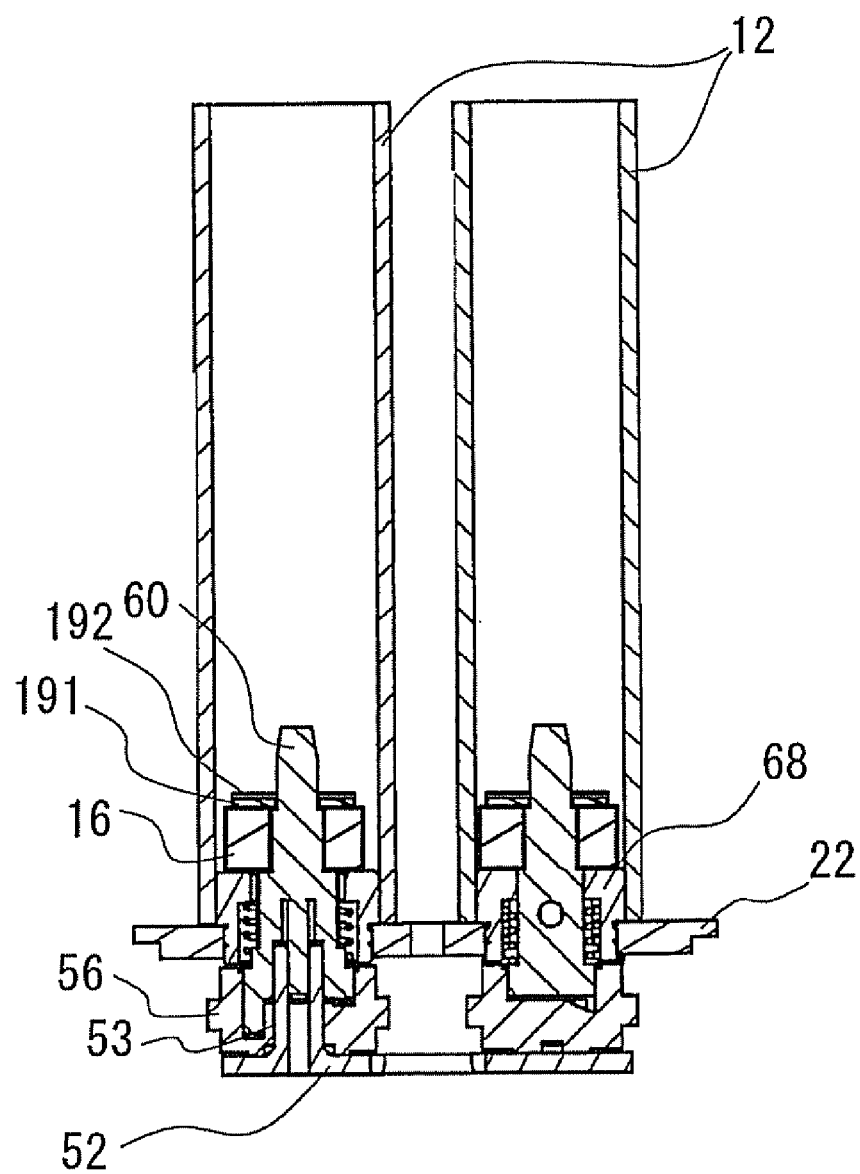

[Fig. 9]
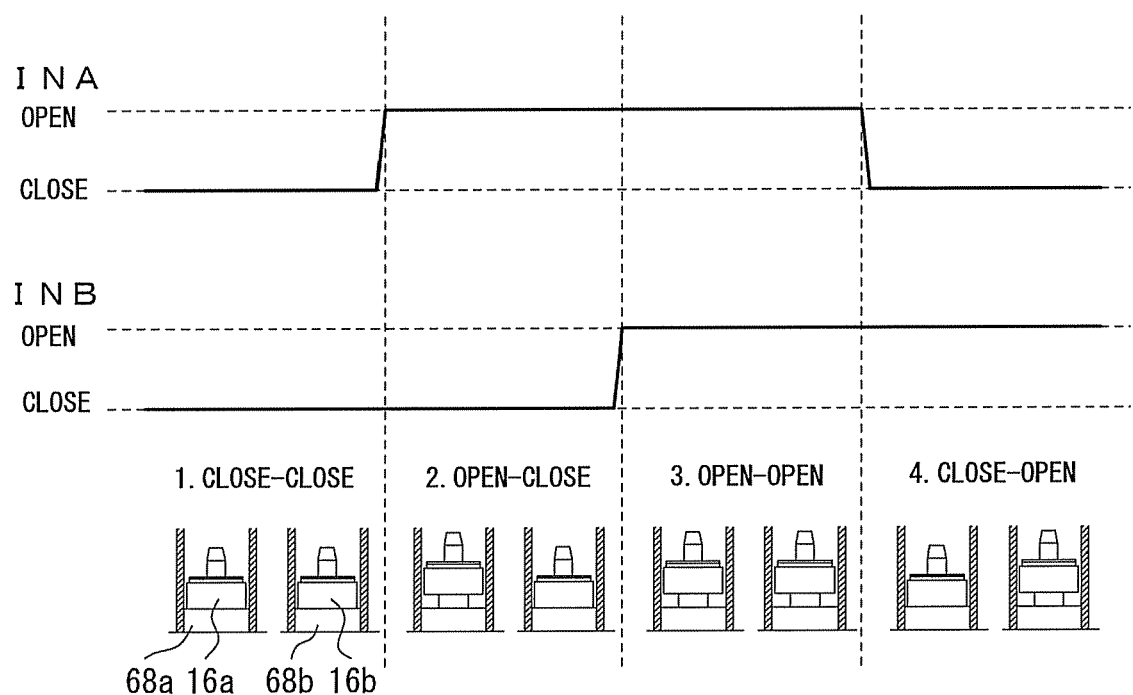

[Fig. 10]
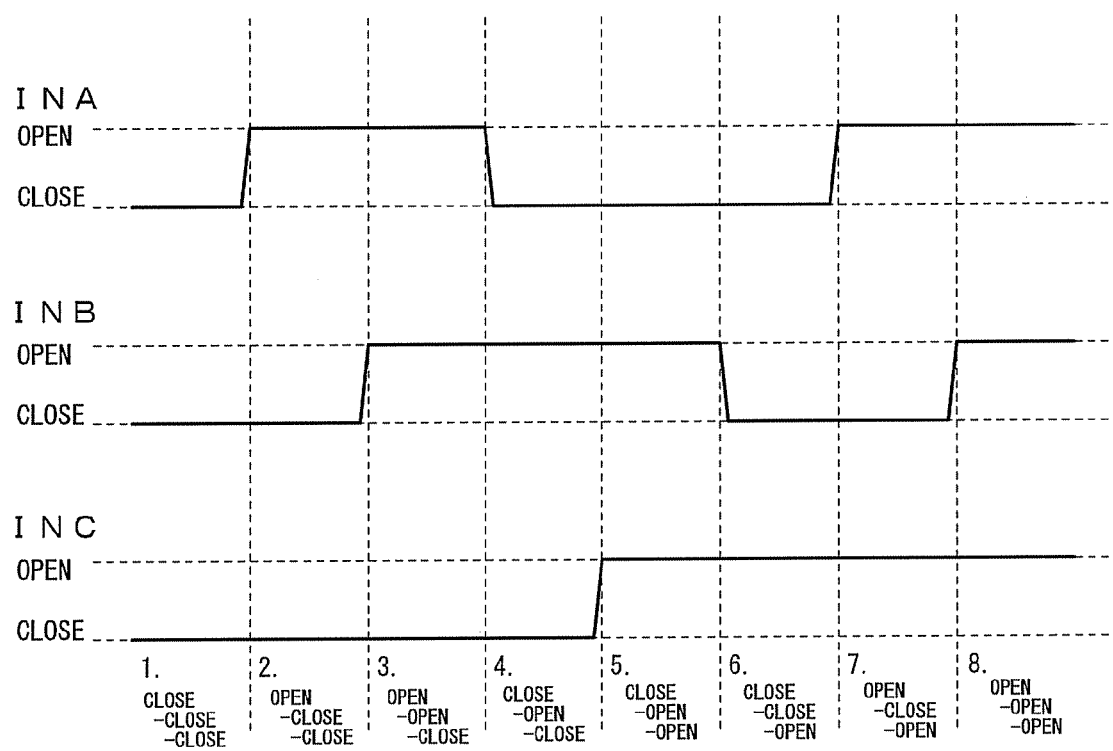

VALVE ELEMENT OPENING/CLOSING DEVICE

CROSS REFERENCE TO RELATED APPLICATION

The present invention claims priority under 35 U.S.C. §119 to Japanese Application No. 2007-104620 filed Apr. 12, 2007, which is incorporated herein by reference.

FIELD OF THE INVENTION

An embodiment of the present invention may relate to a valve element opening/closing device. More specifically, an embodiment of the present invention may relate to a valve element opening/closing device in which a valve element is operated by a motor to open and close a flow passage.

BACKGROUND OF THE INVENTION

Valve element opening/closing devices have been conventionally known in which a valve element is driven by a motor as a drive source to open and close a flow passage for refrigerant in a refrigerator or the like. For example, in Japanese Patent Laid-Open No. 2000-346225, a valve element opening/closing device is disclosed in which a valve element including a needle valve is advanced and retreated with a screw mechanism to open and close a flow passage into which refrigerant flows.

In the valve element opening/closing device, a turning prevention mechanism for a valve element is provided so that the valve element to which a rotary power of the motor is applied is not rotated. In the above-mentioned Patent Reference, turning of the valve element is prevented by a bearing plate which is protruded from an outer peripheral face of the valve element and engaged with the valve element.

However, in the structure as described in the above-mentioned Patent Reference, a newly separate member is required to prevent turning of the valve element and thus a manufacturing cost of the valve element opening/closing device increases.

Further, the turning prevention mechanism which is described in the Patent Reference, a turning prevention member is protruded from the outer peripheral face of the valve element and the protruded part is restricted to be turned so that turning of the valve element is prevented. Therefore, a size of the valve element opening/closing device is not reduced.

SUMMARY OF THE INVENTION

In view of the problems described above, an embodiment of the present invention may advantageously provide a valve element opening/closing device which is provided with a turning prevention mechanism for a valve element without requiring a new other separate member and with a compact structure.

Thus, according to an embodiment of the present invention, there may be provided a valve element opening/closing device including a main body which is formed with a space in an inside of the main body, an inflow pipe which is connected to the main body for flowing fluid into the space, an outflow pipe which is connected to the main body for flowing the fluid out from the space, a valve element for opening and closing a flow passage through which the fluid flows from the inflow pipe to the outflow pipe through the main body, and a drive part for driving the valve element to open and close the flow passage. The valve element is disposed at an opening which is formed in the main body and connected to the inflow pipe, and the drive part includes a motor which is a drive source, and a linearly moving mechanism part for driving the valve element so as to abut with or separate from the opening by rotation of the motor. The linearly moving mechanism part includes a rotary power transmission member which is turned by the motor, a linearly moving member for moving the valve element in an open direction which is moved through a cam face that is formed on a valve element side of the rotary power transmission member, a turning prevention mechanism which restricts turning of the linearly moving member, and an urging member for urging the valve element in a closing direction. The turning prevention mechanism includes a shaft which turnably supports the rotary power transmission member, and a shaft hole which is formed in the linearly moving member that is supported by the shaft, and the shaft is engaged with the shaft hole to prevent turning of the linearly moving member.

According to the valve element opening/closing device of the embodiment of the present invention, the turning prevention mechanism for the linearly moving member moving the valve element, which opens and closes the opening which is a flow passage of fluid, is structured of the shaft, which supports the rotary power transmission member that is driven and turned by the motor, and the shaft hole of the linearly moving member which is engaged with the shaft. Therefore, a new separate member is not required to structure the turning prevention mechanism for the linearly moving member, i.e., the valve element, and thus a manufacturing cost of the valve element opening/closing device can be reduced. Further, the members for restricting the turning of the valve element do not protrude from the linearly moving member and the rotary power transmission member and thus the structure of the linearly moving mechanism part is made compact and the size of the valve element opening/closing device can be reduced.

Specifically, the valve element opening/closing device may further include a base plate which structures the main body, and a plate which is fixed to the base plate and to which the shaft is fixed, and the shaft turnably supports a transmitting gear as the rotary power transmission member. In addition, the linearly moving member is a slider which is engaged with the transmitting gear, and the shaft is passed through a shaft hole of the slider so that the slider is supported by the shaft and movable in an axial direction of the shaft, and the valve element is attached to the slider. Further, an outer peripheral face of the shaft and an inner peripheral face of the shaft hole of the slider are engaged with each other to structure the turning prevention mechanism for the slider.

In the embodiment of the present invention, it is preferable that the turning prevention mechanism includes a recessed part which is formed on an outer peripheral face of the shaft and a protruded part which protrudes from the shaft hole of the linearly moving member to an inner side of the shaft hole to engage with the recessed part. Specifically, the turning prevention mechanism may include a recessed engaging part which is formed in the shaft and a protruded engaging part which is protruded on an inner side from the shaft hole of the slider. As described above, when the turning prevention mechanism is structured of the recessed part which is formed in the shaft and the protruded part which protrudes from the shaft hole of the linearly moving member on an inner side of the shaft hole, the outer diameter of the linearly moving member is not required to increase to secure the wall thickness in the radial direction of the linearly moving member. Therefore, the cost and size of the valve element opening/closing device can be reduced.

In accordance with an embodiment of the present invention, a turning restriction part is provided in the rotary power transmission member for restricting a turning quantity of the rotary power transmission member to less than one turn. Specifically, the turning restriction part may be formed to be protruded from an outer peripheral face of the transmitting gear for restricting a turning quantity of the transmitting gear to less than one turn. As described above, when the turning of the rotary power transmission member is restricted within one turn, the cam face formed on the rotary power transmission member is not required to vary in the radial direction and thus the structure of the linearly moving mechanism part can be simplified.

In accordance with an embodiment of the present invention, the valve element and the shaft are coaxially disposed each other and movement in the radial direction of the linearly moving member is restricted by the shaft or the rotary power transmission member. As described above, when the valve element and the shaft are coaxially disposed each other and movement in the radial direction of the linearly moving member is restricted by the shaft or the rotary power transmission member, inclination of the linearly moving member, i.e., inclination of the valve element can be prevented with a simple structure and without using a separate member.

Further, in accordance with an embodiment of the present invention, a gear side cam face is formed on a slider side face of the transmitting gear that is rotatably supported by the shaft, and a slider side cam face is formed on the slider so as to abut with the gear side cam face of the transmitting gear. In this structure, the slider is moved in the axial direction of the shaft depending on a turning position of the transmitting gear through abutment of the gear side cam face with the slider side cam face to move the valve element which is attached to the slider. According to the structure as described above, the structure for moving the slider in the axial direction of the shaft can be formed within the radial size of the transmitting gear and thus the size of the valve element opening/closing device can be reduced.

Further, in accordance with an embodiment of the present invention, the opening which is connected to the inflow pipe is formed in the base plate, and a valve seat is fixed to the opening that is formed in the base plate for shutting off the flow passage when the valve element is tightly contacted with the valve seat. In addition, the slider is formed as a shaft member which includes a base part which is formed on a transmitting gear side, an end part to which the valve element is attached, and a main body part which connects the base part and the end part and is disposed so as to pass through the valve seat. When the slider is structured as the above-mentioned shaft member, the mechanism for moving the valve element can be structured within an approximately the same size in the radial direction as that of the inflow pipe and the size of the valve element opening/closing device can be reduced.

In this case, it may be structured that a gear side cam face is formed on a face on the base part side of the slider of the transmitting gear that is rotatably supported by the shaft, and a slider side cam face is formed on the base part of the slider so as to abut with the gear side cam face of the transmitting gear. The slider is moved in the axial direction of the shaft depending on a turning position of the transmitting gear through abutment of the gear side cam face and the slider side cam face to move the valve element which is attached to the slider.

Further, the urging member may be a spring which is disposed around an outer periphery of the main body part of the slider for urging the slider side cam face of the slider to the gear side cam face of the transmitting gear.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a cross-sectional view showing a valve element opening/closing device in accordance with a first embodiment of the present invention.

FIG. 2 is a perspective outward appearance view showing the valve element opening/closing device shown in FIG. 1.

FIG. 3 is an exploded perspective view showing a structure of a linearly moving mechanism part in the valve element opening/closing device shown in FIG. 1.

FIG. 4 is another exploded perspective view showing the structure of the linearly moving mechanism part in the valve element opening/closing device shown in FIG. 1.

FIG. 5 is an "F-F" cross-sectional view showing the valve element opening/closing device shown in FIG. 1.

FIG. 6 is a cross-sectional view for explaining an assembling method of the valve element opening/closing device shown in FIG. 1 and showing a state in which a valve seat and inflow pipes are fixed to a base plate.

FIG. 7 is a cross-sectional view for explaining an assembling method of the valve element opening/closing device shown in FIG. 1 and showing a state in which a valve element is assembled from a tip end side of the inflow pipe.

FIG. 8 is a cross-sectional view for explaining an assembling method of the valve element opening/closing device shown in FIG. 1 and showing a state in which the valve element has been assembled to a slider.

FIG. 9 is a time chart for explaining an opening/closing operation of the valve element opening/closing device shown in FIG. 1.

FIG. 10 is a time chart for explaining an opening/closing operation of a valve element opening/closing device in accordance with a second embodiment of the present invention.

DETAILED DESCRIPTION OF THE PREFERRED EMBODIMENTS

An embodiment of the present invention will be described in detail below with reference to the accompanying drawings. FIG. 1 is a cross-sectional view showing a valve element opening/closing device 1 in accordance with a first embodiment of the present invention and FIG. 2 is its perspective outward appearance view.

The valve element opening/closing device 1 is a so-called "2-IN/1-OUT" valve which is capable of selectively outputting, e.g., passing either one of two kinds of fluids, e.g., two kinds of fluids whose temperatures are different from each other, which are inputted or flown into the device. In this embodiment, structural components for controlling fluid "A" inputted into the device have the same structure as those for controlling fluid "B". Further, when it is required to be distinguished from each other, the notational symbol "a" is added to the structural components for controlling the fluid "A" and the notational symbol "b" is added to the structural components for controlling the fluid "B".

The valve element opening/closing device 1 includes a main body 10 having a fluid cavity 5 in its inside, inflow pipes 12 which are connected to the main body 10 and are flow passages for fluid flowing into the fluid cavity 5, an outflow pipe 14 which is a flow passage for the fluid flowing out from the fluid cavity 5, valve elements 16, each of which is arranged within the inflow pipe 12 and which is tightly contacted with and separated from a valve seat 68 to open and close the flow passage for fluid flowing into the fluid cavity 5, and a drive part 18 for driving the valve element 16 so as to open and close. Respective structures will be described below.

The main body 10 is a case body within which the fluid cavity 5 is formed and the main body 10 is structured of a main body case 20 and a base plate 22. The main body case 20 is formed by a press-drawing work by using stainless steel material so as to be provided with a large cylindrical part 201 having a relatively large diameter and a small cylindrical part 202 having a relatively small diameter.

The base plate 22 is a plate member made of stainless steel. In this embodiment, the base plate 22 is formed with inflow ports 24 for flowing fluid into the fluid cavity 5 and an outflow port (not shown) for flowing the fluid out from the fluid cavity 5. Further, positioning pins 23 are stood up at two positions for positioning and fixing a plate 52 described below to the base plate 22.

A flange part 21 is formed at an opening edge part of the large cylindrical part 201 of the main body case 20, and a periphery of the base plate 22 is formed with a step portion 221. The flange part 21 and the step portion 221 are fixed to each other by TIG (tungsten inert gas) welding to structure the main body 10.

The inflow pipe 12 and the outflow pipe 14 are pipes made of copper. The inflow pipes 12 and the outflow pipe 14 are respectively connected and fixed to the inflow ports 24 and the outflow port (not shown) which are formed in the base plate 22 by brazing. In this manner, flow passages for fluid flowing into the fluid cavity 5 of the main body 10 are formed and a flow passage for the fluid flowing out from the fluid cavity 5 is formed.

A valve element 16 is an elastic member made of rubber and having a cylindrical shape. The valve element 16 is fixed to a step portion 661 formed to an end part 66 of a slider 60 described below by a spring nut 192 through a washer 191. The valve element 16 is tightly contacted with and separated from the valve seat 68 by a driving force of a motor 30 to open and close a flow passage for fluid flowing into the valve element opening/closing device 1.

A driving part 18 includes the motor 30 which is a drive source and a linearly moving mechanism part 50 for transmitting the driving force of the motor 30 to the valve element 16.

The motor 30 is a well-known stepping motor which includes a rotor 32 and a stator part 40. The rotor 32 is rotatably supported by a support shaft 90 which is supported by the main body case 20 and a center portion of the base plate 22. The rotor 32 is provided with a cylindrical shaft part 34 to which a support shaft 90 is inserted so that the cylindrical shaft part 34 can be rotated, and a circular ring shaped magnet (permanent magnet) 36 is integrally fitted to the cylindrical shaft part 34 in a supported state by holding parts 341 which are formed on both outer peripheral edges of the cylindrical shaft part 34. Further, an output gear 38 for outputting a rotary power of the motor 30 through a coupling mechanism (not shown) is formed on the base plate 22 side of the rotor 32 so as to rotate with the rotor 32 in an integral manner. The output gear 38 is inserted through a through-hole 521 of the plate 52 and located on the inner side of the large cylindrical part 201.

A stator part 40 comprised of two layer stators 401 is formed on an outer peripheral face of the small cylindrical part 202 of the main body case 20 so as to face the rotor 32. A drive coil 44 is wound around a coil bobbin 42 to form each of the stators 401. The stator part 40 is fixed to a stator case 46 so that its outer peripheral face is surrounded by the stator case 46 and fitted to the outer side of the main body case 20.

In each of the drive coils 44 of the stators 401, respective tip end parts of terminals for the drive coils 44 are connected to predetermined positions of a control circuit board 48. Rotation of the rotor 32 is controlled by controlling energization to the drive coils 44 through the control circuit board 48.

The linearly moving mechanism part 50 includes the plate 52, a transmitting gear 56, the slider 60 and a spring 70. Exploded views for explaining a structure of the linearly moving mechanism part 50 are shown in FIGS. 3 and 4.

The plate 52 is a plate-shaped member which is integrally formed by using poly-nano-methylene terephthalamide (PA9T: polyamide 9T) and is a member which is mounted to the base plate 22. The through hole 521 through which the output gear 38 of the rotor 32 is passed is formed at a roughly center portion of the plate 52. Further, two shafts 53 and two positioning bosses 54 are formed around the through hole 521 so as to interpose the through hole 521. The shaft 53 is a shaft member by which the transmitting gear 56 and the slider 60 are supported. A recessed part 531 which is a part of a turning prevention mechanism for the slider 60 is formed in the outer peripheral face of the shaft 53 so as to extend in its longitudinal direction. The positioning pin 23 stood on the base plate 22 is engaged with the positioning boss 54, whereby the plate 52 is positioned and fixed at a prescribed position.

The transmitting gear 56 is a gear which is, similarly to the plate 52, integrally formed by using poly-nano-methylene terephthalamide (PA9T), and which is engaged with the output gear 38 of the rotor 30. The transmitting gear 56 is formed on its axis of rotation with a penetrated shaft hole 57 into which the shaft 53 is inserted so that the transmitting gear 56 can be turned. Further, a bottomed engaging hole 58 whose diameter is larger than that of the shaft hole 57 is formed on a slider side face of the transmitting gear 56 in a coaxial manner with the shaft hole 57. A bottom face of the engaging hole 58 is formed with a recessed cam face 59 as a gear side cam face which is formed with a cam groove 591 formed in a prescribed width along a wall face of the engaging hole 58. The cam groove 591 is formed so that its groove is deepened along a turning direction of the transmitting gear 56. In accordance with an embodiment, the recessed cam face 59 may be formed as a protruded cam face which is protruded from a flat face of the gear.

A turning restriction part 561 is formed on an outer peripheral face on a lower side of the transmitting gear 56. The turning restriction part 561 is a protruded member for setting a home position of the transmitting gear 56 and for preventing the transmitting gear 56 from turning more than one turn. The turning restriction part 561 is formed so as to protrude from the outer peripheral face of the transmitting gear 56. Further, a circular recessed part 562 is formed in the turning restriction part 561. The recessed part 562 is used so that a positional relationship between the transmitting gear 56a for fluid "A" and the transmitting gear 56b for fluid "B" is set to be in a predetermined relationship in the turning direction. Specifically, for example, two positioning pins are stood on a jig plate and the positioning pins are respectively engaged with the recessed parts 562 so that the transmitting gears 56a and 56b are positioned in a prescribed positional relationship.

The slider 60 is, similarly to the plate 52 and the transmitting gear 56, integrally formed by using poly-nano-methylene terephthalamide (PA9T) and is a shaft member including a base part 62, a main body part 64, and an end part 66.

The base part 62 is a part which is engaged with the engaging hole 58 of the transmitting gear 56. The bottom face of the base part 62 is formed with a protruded cam face 63 as a slider side cam face on which a projection 631 for engaging with the cam groove 591 is formed.

The main body part 64 is a part which is passed through a spring 70 and the valve seat 68. An outer peripheral face of the main body part 64 is formed in a longitudinal direction with grooves 641 having a prescribed width at intervals of 90 degrees in its turning direction. FIG. 5 is an "F-F" cross-sectional view in FIG. 1 and is a cross-sectional view showing an abutting face of the valve seat 68 with the valve element 16. As shown in FIG. 5, when the main body part 64 is inserted into the shaft hole 681 of the valve seat 68, openings 65 are formed between the shaft hole 681 of the valve seat 68 and the main body part 64 of the slider 60 through the grooves 641. When the valve element 16 is moved to an open state, fluid inputted into the valve element opening/closing device 1 flows into the fluid cavity 5 through the openings 65.

The end part 66 is a part to which the valve element 16 is fitted and fixed and, as described above, the valve element 16 is placed on the stepped part 661 and fixed.

Further, a shaft hole 67 into which the shaft 53 is inserted is formed in the slider 60. A protruded engaging part 671 is formed in the shaft hole 67 so as to protrude to an inner side in the radial direction of the shaft hole 67. The protruded engaging part 671 engages with a recessed engaging part 531 formed in the shaft 53 fixed to the plate 52 to structure a turning prevention mechanism for the slider 60 (valve element 16). However, the turning prevention mechanism is not limited to this structure. In other words, a mechanism may be used in which turning of the slider 60 (valve element 16) is prevented by engagement of the shaft 53 and the shaft hole 67. For example, a so-called "D-cut" structure in which cross sections of the shaft 53 and the shaft hole 67 are formed in a "D"-shape may be adopted, or a so-called serration structure in which their cross sections are formed in a saw-tooth shape may be adopted. In this manner, a separate member for preventing turning of the slider 60 (valve element 16) is not required and a structure of the linearly moving mechanism part 50 can be made compact. Especially, like this embodiment, even when a plurality of input ports are provided and a plurality of the linearly moving mechanism parts 50 are provided so as to correspond to the input ports, a member for restricting turning of the valve element 16 does not protrude on an outer peripheral side of the transmitting gear 56 and the slider 60 and thus a size of the valve element opening/closing device 1 can be reduced.

Further, the slider 60 is inserted and supported by the shaft 53 so as to be movable in the axial direction of the shaft 53 and, as described above, the slider 60 is engaged with engaging hole 58 of transmitting gear 56. Therefore, movement of the slider 60 in a perpendicular direction (radial direction) with respect to its axial line is restricted. Accordingly, slanting or inclination of the slider 60, i.e., slanting or inclination of the valve element 16 can be prevented and thus, when the flow passage for fluid is closed, the valve element 16 and the valve seat 68 are tightly contacted with each other in a parallel manner and the flow passage is closed securely.

The valve seat 68 is a cylindrical member made of stainless steel. The valve seat 68 is formed with a shaft hole into which the main body part 64 of the slider 60 is inserted, and a spring accommodating hole 681 which is formed larger than this shaft hole and is capable of accommodating a spring 70 which is provided around the main body part 64 of the slider 60. The valve seat 68 is formed of a small diameter part and a large diameter part. The small diameter part of the valve seat 68 is press-fitted to each of the inflow ports 24 which are formed in the base plate 22 and, as a result, the valve seat 68 is fixed to the base plate 22.

An assembling method for the valve element opening/closing device 1 which is structured as described above will be described below with reference to FIGS. 6 and 7 and FIG. 1.

First, the valve seats 68 are press-fitted into the inflow ports 24 of the base plate 22 and fixed, and then the inflow pipes 12 and the outflow pipe 14 are fixed by brazing (see FIG. 6). In this case, any brazing material may be used but nickel brazing is the most preferable.

Next, the transmitting gear 56 and the slider 60 are fitted to the shaft 53 of the plate 52. Specifically, the base part 62 of the slider 60 is fitted into the engaging hole 58 of the transmitting gear 56, and the transmitting gear 56 and the slider 60 are fitted to the shaft 53 in a state that a recessed cam face 59 of the transmitting gear 56 and a protruded cam face 63 of the slider 60 are abutted with each other. In this case, the recessed engaging part 531 formed in the shaft 53 and the protruded engaging part 671 formed in the shaft hole 67 of the slider 60 are engaged with each other. Further, the transmitting gear 56a for fluid "A" and the transmitting gear 56b for fluid "B" are assembled so that the transmitting gears are set in a prescribed positional relationship in the turning directions by utilizing the recessed parts 562 as described above. After that, the spring 70 is fitted around the main body part 64 of the slider 60.

In this state, the positioning pin 23 stood on the base plate 22 is engaged with the positioning boss 54 of the plate 52 to mount the plate 52 on the base plate 22. In this manner, the transmitting gear 56 and the slider 60 are supported between the base plate 22 and the plate 62. Further, the spring 70 is held between the valve seat 68 and the slider 60. After that, the valve element 16 and the like are dropped from a tip end side of the inflow pipe 12 (see FIG. 7) and then fixed to the end part 66 of the slider 60 (see FIG. 8).

Finally, the main body case 20 in which the rotor 32 is accommodated and the base plate 22 are fixed by TIG welding and then, the stator part 40 and a mounting plate 99 for fixing the valve element opening/closing device 1 to a refrigerator or the like are attached and assembling of the valve element opening/closing device 1 is completed (see FIG. 1).

Next, an opening/closing operation of the valve element 16 in the valve element opening/closing device 1 will be described below with reference to a time chart shown in FIG. 9. In this time chart, "INA" indicates an opening/closing state of the valve element 16a and "INB" indicates an opening/closing state of the valve element 16b. Further, under the time chart in the drawing, opening/closing states of the valve element 16a and the valve element 16b are schematically shown. In the following description, the notational symbol "a" is added to the structural components for controlling the fluid "A" and the notational symbol "b" is added to the structural components for controlling the fluid "B".

In the initial state (home position) in this time chart, the valve elements 16a and 16b are pressed against the valve seats 68a and 68b by fluid pressures to be inputted and both the openings 65a and 65b (inflow ports 24a and 24b) are in closed states: the mode (1. close-close).

In this state, when the motor 30 is driven and the rotor 32 is rotated, the transmitting gears 56a and 56b are turned by the rotor 32. In this case, a turning direction of the transmitting gear 56a is opposite to that of the transmitting gear 56b. When the rotor 32 is rotated by a predetermined amount, the slider 60a whose movement in the turning direction is restricted by the above-mentioned turning prevention mechanism is pushed up by the recessed cam face 59a of the transmitting gear 56a and thus the valve element 16a is moved to be in an open state. On the other hand, the valve element 16b is still remained in a closed state: the mode (2. open-close). In this case, the spring 70a interposed between the slider 60a and the valve seat 68a is contracted because the slider 60a is pushed up and thus the valve element 16a is urged to the closing direction by the spring 70a.

Next, when the rotor 32 is rotated by a further predetermined amount, the slider 60b is pushed up by the recessed cam face 59b of the transmitting gear 56b and the valve element 16b is moved to be in an open state. On the other hand, the valve element 16a is still remained in the open state: the mode (3. open-open). In this case, similarly to the valve element 16a, the spring 70b is contracted and the valve element 16b is urged to the closing direction by the spring 70b.

Next, when the rotor 32 is rotated by a further predetermined amount, the pushing-up state of the slider 60a by the recessed cam face 59a of the transmitting gear 56a is released. As a result, the valve element 16a is returned to the closed state by the urging force of the spring 70a. In addition, in this case, the valve element 16a receives an urging force to the closing direction due to a pressure of the fluid flowing into the fluid cavity 5 in addition to an urging force of the spring 70a and pressed to the valve seat 68. Therefore, flow of the fluid can be shut off securely: the mode (4. close-open).

As described above, the valve element opening/closing device 1 in accordance with an embodiment of the present embodiment is provided with four different modes as an opening/closing state of the valve elements 16a and 16b, which are controlled to be a desired mode by appropriately changing a forward/reverse rotation of the motor 30. In this embodiment, the modes where either one of the valve elements 16a and 16b is opened, i.e., the mode (2. open-close) and the mode (4. close-open) are appropriately changed, either of two kinds of fluid to be inputted can be selectively passed.

In the description of the opening/closing operation of the valve element 16, the initial state (home position) is the mode (1. close-close) but the present invention is not limited to this embodiment. For example, the opening/closing operation may be controlled such that the above-mentioned four different modes are appropriately changed by changing a rotating amount of the rotor 32.

Further, in the embodiment described above, it is structured that the mode (3. open-open) where the valve elements 16a and 16b are positioned in the open state is selectable. This mode is preferably used when the base plate 22 is heated to a high temperature at the time that the inflow pipes 12 and the outflow pipe 14 of the valve element opening/closing device 1 are connected with the flow passages for fluid of the base plate 22 by welding (brazing). In this case, both the valve elements 16a and 16b are separated apart from the base plate 22 and thus damage of the valve elements 16a and 16b due to welding heat can be prevented. Further, this mode may be used when two kinds of fluid to be inputted are mixed and passed on the basis of modes required to the valve element opening/closing device 1.

Next, a valve element opening/closing device in accordance with a second embodiment of the present invention will be described below. The valve element opening/closing device in this embodiment is a so-called "3-IN/1-OUT" valve in which three kinds of fluids (for example, three kinds of fluid at different temperatures) inflowing (inputting) to the device is selectively outputted or passed as one kind of fluid.

The valve element opening/closing device is different from the valve element opening/closing device 1 in the first embodiment only at the point that, according to increase of the number of an input fluid, a corresponding flow passage (inflow pipe 12) and structural components of the linearly moving mechanism part 50 such as the transmitting gear 56 and the slider 60 are increased. Therefore, structural components newly added in the valve element opening/closing device in accordance with the second embodiment are indicated by adding the notational symbol "c" and their detailed structure and assembling method are omitted.

Opening/closing operations of the valve elements 16 in this valve element opening/closing device will be described below with reference to a time chart in FIG. 10. In this time chart, "INA" indicates an opening/closing state of the valve element 16a, "INB" indicates that of the valve element 16b, and "INC" indicates that of the valve element 16c.

First, in the initial state (home position), the valve elements 16a through 16c are pressed by pressures of fluids inputted to the valve seats 68a through 68c. Therefore, all openings 65a through 65c (inflow ports 24a through 24c) are in a closed state: the mode (1. close-close-close).

When the rotor 32 is rotated by driving the motor 30 from this state, the transmitting gear 56a through 56c are turned by the rotor 32. When the rotor 32 is rotated by a predetermined amount, the slider 60a whose movement in a rotating direction is restricted by the above-mentioned turning prevention mechanism is pushed up by the recessed cam face 59a of the transmitting gear 56a and thus the valve element 16a is moved to be in an open state. On the other hand, the valve elements 16b and 16c still remain in the closed state: the mode (2. open-close-close). When the slider 60a is pushed up, the spring 70a disposed between the slider 60a and the valve seat 68a is contracted by the slider 60a and thus the valve element 16a is urged in a closing direction by the spring 70a.

When the rotor 32 is further rotated by a predetermined amount from this state, the slider 60b is pushed up by the recessed cam face 59b of the transmitting gear 56b and the valve element 16b is moved to be in an open state. On the other hand, the open state of the valve element 16a and the closed state of the valve element 16c are maintained: the mode (3. open-open-close). When the slider 60b is pushed up, similarly to the case of the valve element 16a, the spring 70b is contracted and the valve element 16b is urged in a closing direction by the spring 70b.

Next, when the rotor 32 is further rotated by a predetermined amount, pushing-up of the slider 60a by the recessed cam face 59a of the transmitting gear 56a is released. Therefore, the valve element 16a is returned to the closed state by the urging force of the spring 70a. Further, in this case, in addition to the urging force of the spring 70a, the valve element 16a receives an urging force in the closing direction due to pressure of the fluid flowing into the fluid cavity 5 and pressed to the valve seat 68. As a result, flowing of the fluid is shut off surely: the mode (4. close-open-close).

When the rotor 32 is further successively rotated by a predetermined amount from this mode, the valve element 16c is moved to be in an open state: the mode (5. close-open-open) and next, the valve element 16b is moved by the urging force of the spring 70b and the pressure of fluid to the closed state: the mode (6. close-close-open) and next, the valve element 16a is moved to the open state: the mode (7. open-close-open) and finally, the valve element 16b is moved to the open state and all of the valve elements 16a through 16c are located in the open state: the mode (8. open-open-open).

As described above, the valve element opening/closing device in accordance with the second embodiment provides eight modes as open/close states of the valve elements 16a through 16c. In these modes, when the modes where either one of the valve elements 16a through 16c is in the open state are appropriately changed, in other words, when the mode (2. open-close-close), the mode (4. close-open-close) and the mode (6. close-close-open) are appropriately changed, either one of three fluids to be inputted is selectively passed.

According to this valve element opening/closing device, in three kinds of fluid inputted into the valve element opening/closing device, when the modes where two or more kinds of fluid are mixed and passed are appropriately changed, in other words, when the mode (3. open-open-close), the mode (5. close-open-open), the mode (7. open-close-open), and the mode (8. open-open-open) are appropriately changed, a temperature of fluid to be outputted can be adjusted.

Further, similarly to the valve element opening/closing device 1 in accordance with the first embodiment, damage of the valve elements 16a through 16c due to heat at the time of welding can be prevented by selecting the mode (8. open-open-open) where all of the valve elements 16a through 16c are located in the open state.

In the valve element opening/closing devices in accordance with the first and the second embodiments, a driving force of the motor 30 is transmitted to the transmitting gears 56 from the output gear 38. However, the present invention is not limited to this embodiment. In other words, another transmission mechanism where a pulley or a sprocket is used may be adopted without using the above-mentioned gear mechanism. Further, when a driving force for moving the valve element 16 in the open direction is insufficient, a reduction gear may be disposed between the output gear 38 and the transmitting gear 56 to increase an output torque.

As described above, according to the valve element opening/closing device in accordance with the embodiment, movement in the turning direction of the slider 60 for moving the valve element 16 for opening and closing the flow passage for fluid is restricted by engagement of the recessed engaging part 531 formed in the shaft 53 for supporting the transmitting gear 56 with the protruded engaging part 671 formed in the slider 60. Therefore, a separate member for structuring the turning prevention mechanism for the valve element 16 (slider 60) is not required and thus a manufacturing cost of the valve element opening/closing device can be reduced. Further, the recessed engaging part 531 and the protruded engaging part 671 are engaged with each other within the shaft hole 67 of the slider 60 and they do not protrude from the outer peripheral face of the slider 60 and thus the structure of the linearly moving mechanism part 50 can be made compact.

Further, the transmitting gear 56 is provided with the turning restriction part 561 for restricting its turning within one rotation. Therefore, the circular-shaped cam groove 591 which is formed in the engaging hole 58 of the transmitting gear 56 is not required to vary in its radial direction and thus the structure of the linearly moving mechanism part 50 can be simplified.

In addition, in the embodiment described above, the valve element 16 and the shaft 53 are coaxially disposed and movement in the radial direction of the slider 60 is restricted by the shaft 53 or the transmitting gear 56. Therefore, operation of the valve element 16 (slider 60) while the slider 60 is inclined is prevented with a simple structure and without using another separate member. Accordingly, when the flow passage of the fluid is closed, the valve element 16 and the valve seat 68 are tightly contacted with each other in parallel and thus the flow passage can be shut off securely.

Although the present invention has been shown and described with reference to specific embodiments, various changes and modifications will be apparent to those skilled in the art from the teachings herein.

For example, the valve element opening/closing device in accordance with the embodiment may be preferably applied to a case that the valve element opening/closing device is mounted and fixed to the inside of a refrigerator, etc., through the mounting plate 99 and opening/closing of a flow passage for refrigerant such as isobutane or chlorofluorocarbon (CFC) is controlled. In addition, the present invention may be applied to an opening/closing valve for controlling opening/closing of other liquid or gas.

Further, the drive source in the above-mentioned embodiment is the motor 30, i.e., the stepping motor but a solenoid, a cylinder, etc. may be used as the drive source. In addition, in the embodiment described above, a rotary power is converted into a linear power by using the cam mechanism having the recessed cam face 59 and the protruded cam face 63. However, the present invention is not limited to the above-mentioned structure. Any power transmission mechanism by which a rotational movement can be converted into a linear movement may be utilized. For example, a structure may be applicable in which a valve element is advanced and retreated to and from the opening 65 by rotating a screw member to which the valve element is mounted.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A valve element opening/closing device comprising:
   a main body which is formed with a space in an inside of the main body;
   an inflow pipe which is connected to the main body for flowing fluid into the space;
   an outflow pipe which is connected to the main body for flowing the fluid out from the space;
   a valve element for opening and closing a flow passage through which the fluid flows from the inflow pipe to the outflow pipe through the main body; and
   a drive part for driving the valve element to open and close the flow passage;
   wherein the valve element is disposed at an opening which is formed in the main body and connected to the inflow pipe; and
   wherein the drive part comprises:
      a motor which is a drive source; and
      a linearly moving mechanism part for driving the valve element so as to abut with or separate from the opening by rotation of the motor;
   wherein the linearly moving mechanism part comprises:
      a rotary power transmission member which is rotatable by the motor;
      a linearly moving member for moving the valve element in an open direction which is moved by a cam face that is formed on a valve element side of the rotary power transmission member;
   a turning prevention mechanism which restricts turning of the linearly moving member; and an urging member for urging the valve element in a closing direction; and wherein the turning prevention mechanism comprises:
a shaft which turnably supports the rotary power transmission member; and
a shaft hole which is formed in the linearly moving member that is supported by the shaft; and wherein the shaft is engaged with the shaft hole to prevent turning of the linearly moving member;

wherein the turning prevention mechanism includes a recessed part which is formed in an outer peripheral face of the shaft and a protruded part which is protruded from the shaft hole of the linearly moving member to an inner side of the shaft hole to engage with the recessed part.

2. The valve element opening/closing device according to claim 1, further comprising a turning restriction part which is provided in the rotary power transmission member for restricting a turning quantity of the rotary power transmission member to less than one rotation.

3. The valve element opening/closing device according to claim 1, wherein the valve element and the shaft are coaxially disposed each other and movement in a radial direction of the linearly moving member is restricted by the shaft or the rotary power transmission member.

4. A valve element opening/closing device comprising:
a main body which is formed with a space in an inside of the main body;
an inflow pipe which is connected to the main body for flowing fluid into the space;
an outflow pipe which is connected to the main body for flowing the fluid out from the space;
a valve element for opening and closing a flow passage through which the fluid flows from the inflow pipe to the outflow pipe through the main body; and
a drive part for driving the valve element to open and close the flow passage;
wherein the valve element is disposed at an opening which is formed in the main body and connected to the inflow pipe; and
wherein the drive part comprises:
a motor which is a drive source; and
a linearly moving mechanism part for driving the valve element so as to abut with or separate from the opening by rotation of the motor;
wherein the linearly moving mechanism part comprises:
a rotary power transmission member which is rotatable by the motor;
a linearly moving member for moving the valve element in an open direction which is moved by a cam face that is formed on a valve element side of the rotary power transmission member;
a turning prevention mechanism which restricts turning of the linearly moving member; and
an urging member for urging the valve element in a closing direction; and
wherein the turning prevention mechanism comprises:
a shaft which turnably supports the rotary power transmission member; and
a shaft hole which is formed in the linearly moving member that is supported by the shaft; and
wherein the shaft is engaged with the shaft hole to prevent turning of the linearly moving member;
wherein the valve element opening/closing device further comprises:
a base plate which structures the main body; and
a plate which is fixed to the base plate and to which the shaft is fixed;
wherein the shaft turnably supports a transmitting gear as the rotary power transmission member; and
wherein the linearly moving member is a slider which is engaged with the transmitting gear, and the shaft is passed through a shaft hole of the slider so that the slider is supported by the shaft and movable in an axial direction of the shaft, and the valve element is attached to the slider; and
wherein an outer peripheral face of the shaft and an inner peripheral face of the shaft hole of the slider are engaged with each other to structure the turning prevention mechanism for the slider.

5. The valve element opening/closing device according to claim 4, wherein the turning prevention mechanism includes a recessed engaging part which is formed in the shaft and a protruded engaging part which is protruded on an inner side from the shaft hole of the slider.

6. The valve element opening/closing device according to claim 5, further comprising:
a gear side cam face which is formed on a slider side face of the transmitting gear that is rotatably supported by the shaft; and
a slider side cam face which is formed on the slider and which is abutted with the gear side cam face of the transmitting gear;
wherein the slider is moved in the axial direction of the shaft depending on a turning position of the transmitting gear through abutment of the gear side cam face with the slider side cam face to move the valve element which is attached to the slider.

7. The valve element opening/closing device according to claim 6, further comprising a turning restriction part which is formed to be protruded from an outer peripheral face of the transmitting gear for restricting a turning quantity of the transmitting gear to less than one rotation.

8. The valve element opening/closing device according to claim 4, further comprising a valve seat which is fixed to the opening that is formed in the base plate for shutting off the flow passage when the valve element is tightly contacted with the valve seat;
wherein the opening which is connected to the inflow pipe is formed in the base plate;
wherein the slider is a shaft member comprising:
a base part which is formed on a transmitting gear side;
an end part to which the valve element is attached; and
a main body part which connects the base part and the end part and is disposed so as to pass through the valve seat.

9. The valve element opening/closing device according to claim 8, further comprising:
a gear side cam face of the transmitting gear which is formed so as to face the base part of the slider; and
a slider side cam face which is formed on the base part of the slider so as to abut with the gear side cam face of the transmitting gear;
wherein the slider is moved in the axial direction depending on a turning position of the transmitting gear through abutment of the gear side cam face with the slider side cam face; and
wherein the valve element which is located on an inflow pipe side with respect to the valve seat is moved through the main body part of the slider.

10. The valve element opening/closing device according to claim 9, wherein the urging member is a spring which is disposed around an outer periphery of the main body part of the slider for urging the slider side cam face of the slider to the gear side cam face of the transmitting gear.

* * * * *